June 27, 1967     E. A. HANSON     3,328,742

ELECTRICAL RECEPTACLE UNIT

Filed Nov. 13, 1964

INVENTOR
ERVIN A. HANSON

BY *Sughrue, Rothwell, Mion, Zinn & Macpeak*

ATTORNEYS

United States Patent Office 3,328,742
Patented June 27, 1967

3,328,742
ELECTRICAL RECEPTACLE UNIT
Ervin A. Hanson, Ramsey Addition,
Whitefish, Mont. 50937
Filed Nov. 13, 1964, Ser. No. 411,064
8 Claims. (Cl. 339—14)

The present invention relates to electrical receptacle units, and more specifically to an electrical receptacle unit which is adapted to accommodate a plurality of two and three-prong male plugs.

In many commercial areas such as on construction sites and in garages, there has long been a need for an electrical receptacle unit which is capable of accommodating a plurality of both two and three-prong electric plugs. Of course such receptacles would also have various uses in the home. Although numerous types of multiple outlet electrical receptacles have been designed, not one is capable of receiving both two and three-prong plugs.

Accordingly, it is an object of the present invention to provide an electrical receptacle unit which is adapted to accommodate a plurality of both two and three-prong male plugs.

It is a further object of this invention to provide a multiple outlet electrical receptacle unit which is more compact and durable, and which is less expensive to manufacture than multiple outlet receptacle units have been heretofore.

It is a further object of this invention to provide an electrical receptacle unit which includes structure for assuring that the positive prongs of three-prong male plugs will be electrically connected to a positive source of current and that the negative prong will be electrically connected to a negative source of current.

Other objects of the invention will be pointed out in the following description and claims and illustrated in the accompanying drawings, which disclose, by way of example, the principle of the invention and the best mode which has been contemplated of applying that principle.

Figure 1:
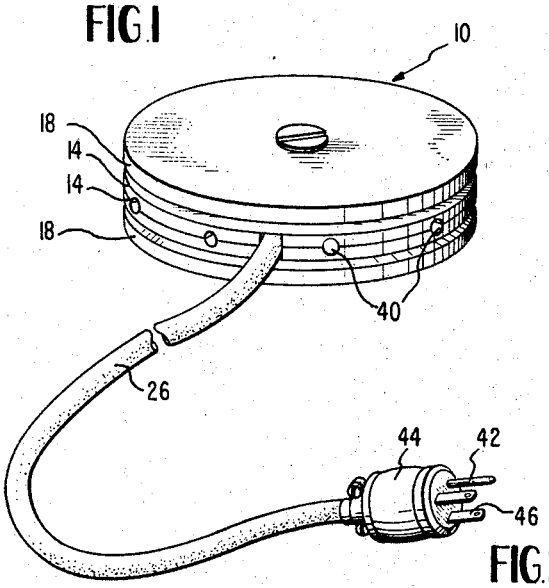
FIGURE 1 is a perspective view of the assembled electrical receptacle unit of the present invention.
Figure 2:
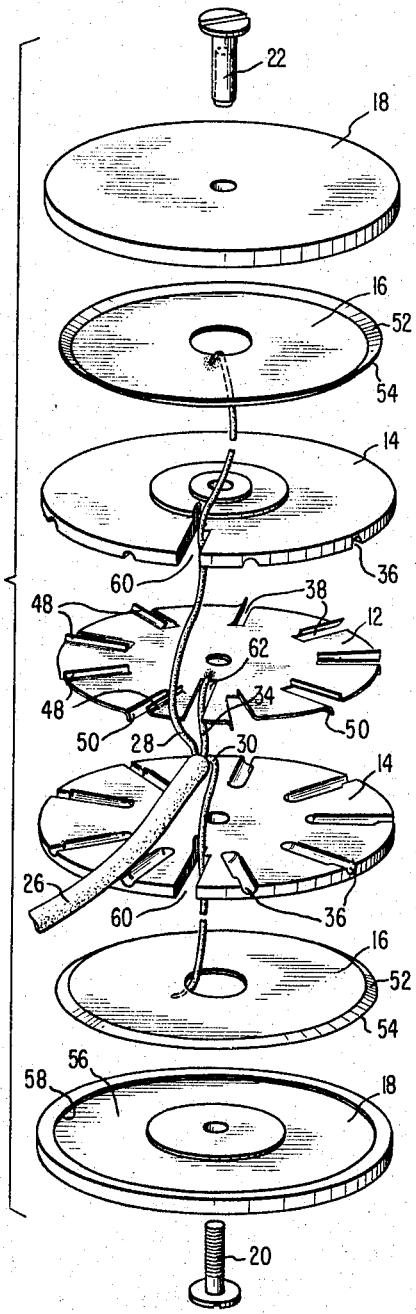
FIGURE 2 is an exploded perspective view of the unit of FIGURE 1.

Referring now to FIGURE 2, the electrical receptacle unit 10 of the present invention is seen to comprise a disk-shaped center plate 12 of conductive material, a pair of disk-shaped inner insulating plates 14, 14 disposed on either side of the center plate 12 so as to sandwich the center plate therebetween, a pair of outer disk-shaped plates 16, 16 of electrically conductive material disposed one adjacent the outer surface of each of the inner insulating plates 14, 14 so as to sandwich the center plate and inner insulating plates therebetween, and a pair of outer insulating covers 18, 18 disposed one adjacent the outer surface of each of the outer conductive plates 16, 16 so as to sandwich the center plate, inner insulating plates, and outer conductive plate therebetween. Each of the plates and covers has an aperture cut therethrough at approximately the center thereof for receiving the threaded shaft of a locking screw 20. The locking screw 20 cooperates with a locking nut 22 to secure the plates and covers together in an assembled relationship, as best shown in FIGURE 1.

The positive and negative wires 28 and 30 of a three-wire electrical cord 26 are soldered or otherwise suitably electrically connected to the outer conductive plates 16, 16 and the ground wire 34 of the electrical cord is soldered or otherwise suitably secured to the conductive center plate 12. In the interest of clarity, the center plate 12 will hereinafter be referred to as the ground contact plate, and the outer conductive plates 16, 16 will be referred to as the power contact plates.

The ground contact plate 12 may have slots 38 cut therein, and the inner surfaces of the inner insulating plates 14, 14 may be provided with grooves 36. As best shown in FIGURE 1, when the contact plates, insulating plates and cover plates are assembled the grooves in the insulating plates and the slots in the ground contact plate will be aligned to form holes 40 for receiving the ground prong of a three-prong male plug. Such a ground plug may be cylindrical, like the prong 42 of the plug 44 of the receptacle unit 10, or it may be flat like the prong 46.

The slots 38 may be formed by cutting along radially inwardly extending lines around the peripheral edge of the ground contact plate 12, bending one of the edges 48 formed by each of the cuts approximately 90° in one direction and then bending the other of the edges 50 approximately 90° in the opposite direction (see FIGURE 2). The upwardly bent edges 48 (as viewed in FIGURE 2) will extend into the grooves 36 in one of the inner insulating disks or plates 14 while the other of the bent edges 50 will extend into the grooves 36 in the other of the inner insulating disks or plates. The bent edges 48 and 50 will serve three functions: they will space the inner insulating disks 14 from the ground contact plate 12 to provide adequate space for a cylindrical or flat ground prong of a male plug; they will provide more surface area for contacting the ground prong; and they will register with the grooves in the inner insulating plates 14, 14 to prevent relative rotational movement between the ground contact plate and the inner insulating plates.

Each of the powered contact plates 16, 16 has its peripheral edge turned outwardly (away from the inner insulating disks 14, 14) to form an annular skirt or flange 52. When the unit 10 is assembled the peripheral edge 54 of the skirt 52 will extend into the annular groove 56 cut in the adjacent outer cover plate 18 and will abut the outer shoulder 58 thereof. The skirt 52 serves two functions: it abuts against the shoulder 58 of the adjacent outer cover plate to prevent relative sliding movement between the power contact plate and the rest of the unit; and it gives the power contact plate a resilient or "spring-like" quality so that a prong inserted between the power contact plate and its adjacent inner insulating plate will be resiliently clamped therebetween.

As shown in FIGURE 2, the inner insulating disks 14 may be provided with slots 60 for permitting the ends of the positive and negative wires 28, 30 of the electrical cord 26 to pass therethrough so that they may be soldered to the power contact plates 16. The ground contact plate 12 may be provided with a slot 62 for facilitating connection of the ground wire 34 to it.

From the foregoing, the use of the electrical receptacle unit 10 is believed to be apparent. When it is desired to insert a three-prong male plug into the unit, the ground prong is inserted into one of the ground prong receiving holes 40 and the power prongs are inserted one between each of the inner insulating plates 14 and its adjacent power contact plate 16. When inserting two-prong male plugs into the receptacle unit, each of the prongs is inserted between one of the inner insulating plates 14 and the adjacent power contact plate 16. As can readily be seen, the receptacle unit 10 is adapted to accommodate numerous plugs of both the three-prong and two-prong variety. For example, a receptacle unit which is approximately three inches in diameter will accept ten three-prong plugs, and more two-prong plugs.

Figure 3:
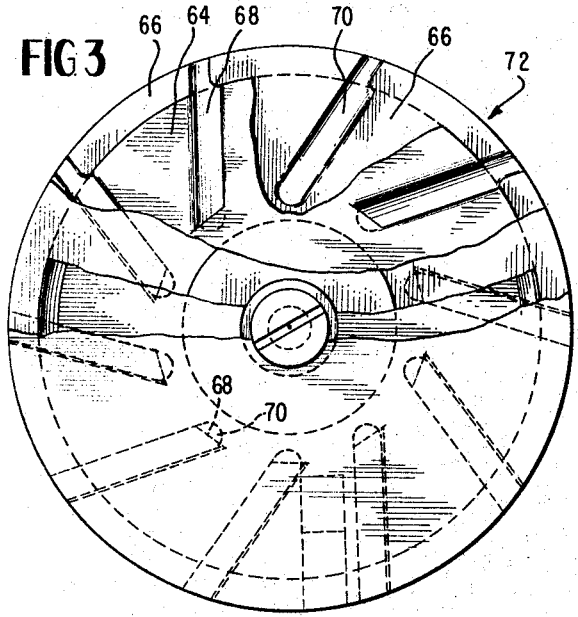
FIGURE 3 is a top view of a modified form of the electrical receptacle unit of the present invention, with portions broken away.

When using certain types of electrical equipment, such as electrical hand tools and electric motors, it is desirable that the positive wire from the equipment be electrically connected to a positive source of current and that the negative wire be electrically connected to a negative source. In order to insure that these connections will be made when using the receptacle unit of the present invention, the ground contact plate 64 and the inner insulating plates 66, 66 shown in FIGURE 3 may be employed in place of the ground contact plate 12 and the inner insulating plates 14, 14 of FIGURE 2. As shown in FIGURE 3, the ground contact plate 64 differs from the ground contact plate 12 in that the slots 68 which are cut therein are disposed at angles with respect to the radii of the plate. Similarly, the inner insulating plates 66 differ from the plates 14 in that the grooves 70 which are cut therein are disposed at angles with respect to the radii of the plates. Consequently, the ground prong receiving holes which are formed by the slots and grooves in the ground contact plate and inner insulating plates when the unit is assembled will be disposed at angles with respect to the radii of the unit.

When a three-prong male plug is inserted into the receptacle unit 72 with the ground prong disposed in one of the angled holes, if the positive prong is inserted on the positive side of the unit (i.e., contacting the power contact plate that is connected to a positive source of current) the plug will fit snugly and squarely against the periphery of the receptacle unit. If, however, the positive prong is inserted on the negative side of the receptacle unit the plug will not fit squarely against the periphery of the unit, and the user will immediately become aware of that fact and will turn the plug or the unit 180° so that the proper connections will be made. Thus, by disposing the slot 68 and grooves 70 at angles with respect to the radii of the plates 64 and 66, a check is provided for insuring that the proper connections will be made between the male plug and the receptacle unit.

Although the receptacle unit of the present invention has been illustrated herein as being disk-shaped or round, it could, of course, be made in any desirable shape. Furthermore, the receptacle can be made larger or smaller to accept more or fewer male plugs.

The receptacle unit is made of durable materials so that it is heavy duty enough to withstand the types of hazards that might occur on construction sites, in garages, etc. It is designed to survive where ordinary type receptacles would be smashed beyond use. The insulating disks and covers may be made, for example, of plastic or plastic-like materials, while the ground and power contact plates may be made of copper.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An electrical receptacle unit adapted to accommodate a plurality of two and three-prong male plugs, comprising: a center plate of electrically conductive material having slot means therein for receiving a prong of each of a plurality of plugs; a pair of inner insulating plates disposed one on either side of said center plate so as to sandwich said center plate therebetween; each of said inner insulating plates including an inner surface facing said center plate and an outer surface facing away from said center plate; a pair of outer conductive plates of electrically conductive material disposed one adjacent the outer surface of each of said inner insulating plates so as to sandwich said center plate and said inner insulating plates therebetween; each of said outer conductive plates including an outer surface facing away from said inner insulating plates; a pair of outer insulating cover plates disposed one adjacent the outer surface of each of said outer conductive plates so as to sandwich said outer conductive plates, said inner insulating plates and said center plate therebetween; and means for securing the plates together in this assembled relationship.

2. An electrical receptacle unit according to claim 1 wherein said center plate includes means defining slots which extend inwardly from the periphery thereof; and wherein the inner surfaces of the inner insulating plates include means defining longitudinally extending notches therein; said slots in said center plate and said notches in said inner insulating plates being aligned to form holes for receiving a prong of a male plug.

3. An electrical receptacle unit according to claim 2, wherein said center plate, said inner insulating plates and said outer cover plates are substantially disk-shaped; and wherein said slots in said center plates and said notches in said inner insulating plates are disposed at angles with respect to radii of the plates.

4. An electrical receptacle unit according to claim 2, wherein one of the longitudinal edges defining each of the slots is bent in one direction to extend into one of the notches in one of the inner insulating plates, and the other of the longitudinal edges of each of said slots is bent in the opposite direction to extend into one of the notches in the other of said inner insulating plates.

5. An electrical receptacle unit according to claim 1, and wherein the means for securing said plates together includes a screw extending through a central hole in the stack of assembled plates.

6. An electrical receptacle unit according to claim 1, wherein each of said outer conductive plates includes an outwardly turned annular skirt integrally fastened to its peripheral edge.

7. An electrical receptacle unit according to claim 5, wherein each of said outer cover plates includes means defining an annular groove in the inner surface thereof for receiving the annular skirt of the adjacent outer conductive plate for preventing relative sliding movement between the outer conductive and the outer cover plate.

8. An electrical receptacle unit adapted to accommodate a plurality of two and/or three-prong male plugs, comprising a substantially disk-shaped center plate of electrically conductive material; means defining a plurality of slots in said center plate extending inwardly from the periphery thereof; a pair of substantially disk-shaped inner insulating plates disposed one on either side of said center plate so as to sandwich said center plate therebetween; each of said inner insulating plates including an inner surface facing said center plate and an outer surface facing away from said center plate; means defining a plurality of notches in the inner surface of each of said inner insulating plates extending inwardly from the periphery thereof; said slot in said center plate and said notches in said inner insulating plates being aligned to form a plurality of holes in said electrical receptacle unit for receiving prongs of male plugs; one of the longitudinal edges of each of said slots in said center plate being bent in one direction to extend into one of said notches in one of said inner insulating plates, and the other of the longitudinal edges of each of said slots in said center plate being bent in the opposite direction to extend into one of the notches in the other of said inner insulating plates; a pair of substantially disk-shaped outer conductive plates of electrically conductive material disposed one adjacent the outer surface of each of said inner insulating plates so as to sandwich said center plate and said inner insulating plates therebetween; each of said outer conductive plates including an outer surface facing away from said inner insulating plates, and an outwardly turned annular skirt integrally fastened to its peripheral edge; a pair of substantially disk-shaped outer cover plates disposed one adjacent the outer surface of each of said outer conductive plates so as to sandwich said outer conductive plates, said inner insulating plates and said center plate therebetween; means defining an annular groove in the inner surface of each of said outer cover plates for receiving the annular skirt of its adjacent outer conductive plate; and means for securing said center plate, said inner insulating plates, said outer conductive plates and said outer cover plates together.

References Cited

UNITED STATES PATENTS

| | | | |
|---|---|---|---|
| 1,907,817 | 5/1933 | Hubbell | 339—20 |
| 1,955,531 | 4/1934 | Christopher | 339—21 |
| 2,563,909 | 8/1951 | Bauer | 339—20 |
| 3,115,378 | 12/1963 | Gelles | 339—20 |
| 3,159,443 | 12/1964 | Hart | 339—14 |

MARVIN A. CHAMPION, *Primary Examiner.*

PATRICK A. CLIFFORD, *Examiner.*